United States Patent [19]
Fifer, Jr.

[11] Patent Number: 5,299,806
[45] Date of Patent: Apr. 5, 1994

[54] EDUCATIONAL DEVICE

[75] Inventor: Fred L. Fifer, Jr., Dallas, Tex.

[73] Assignee: Board of Regents, The University of Texas System, Austin, Tex.

[21] Appl. No.: 96,510

[22] Filed: Jul. 22, 1993

[51] Int. Cl.$^5$ .................. A61F 9/08; G06C 1/00; G09B 19/02
[52] U.S. Cl. .................. 273/159; 434/203
[58] Field of Search .......... 434/188, 203, 204, 216, 434/433; 273/159

[56] References Cited

U.S. PATENT DOCUMENTS

| | | |
|---|---|---|
| 213,642 | 3/1879 | Farnum . |
| 446,535 | 2/1891 | Outerbridge . |
| 592,089 | 10/1897 | Gillegan .................. 273/159 |
| 1,028,381 | 6/1912 | Okamoto .................. 273/159 |
| 4,015,852 | 4/1977 | Gibson .................. 273/153 R |
| 4,221,386 | 9/1980 | Wisniewski .................. 273/159 |
| 4,391,445 | 7/1983 | Vizelyi .................. 273/158 |
| 4,418,915 | 12/1983 | Calebs .................. 273/159 |
| 4,957,292 | 9/1990 | Ushiyama .................. 273/159 |

FOREIGN PATENT DOCUMENTS 8868 of 1904 United Kingdom .................. 273/159

Primary Examiner—Gene Mancene
Assistant Examiner—Cindy A. Cherichetti
Attorney, Agent, or Firm—Warren & Perez

[57] ABSTRACT

An educational device having a chamber with a plurality of holes extending through the chamber. A plurality of ropes are selectively configured in the chamber and portions of the ropes are exposed outside the chamber. The ends of the exposed ropes are connected to knobs that allow a user to pull on a selected rope end thereby causing a movement of another rope end through another hole. The device encourages and permits a mental determination of the configuration of ropes within the chamber.

20 Claims, 3 Drawing Sheets

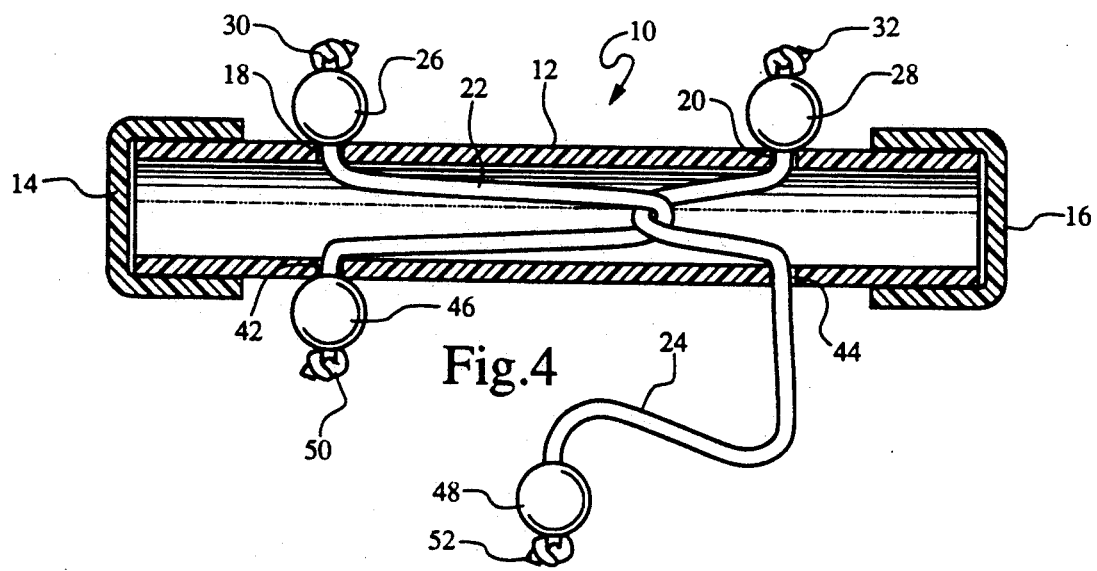
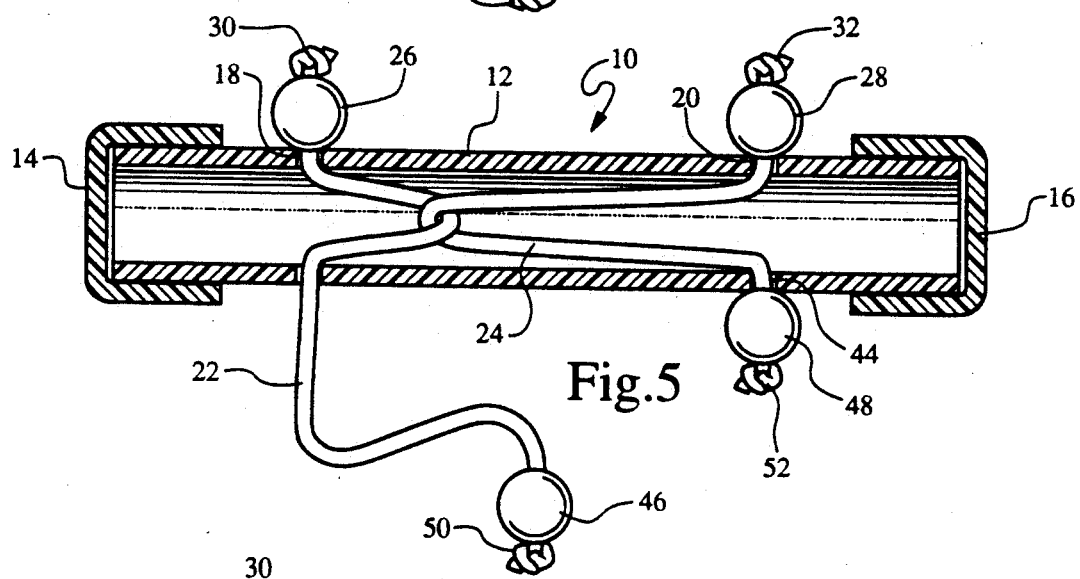
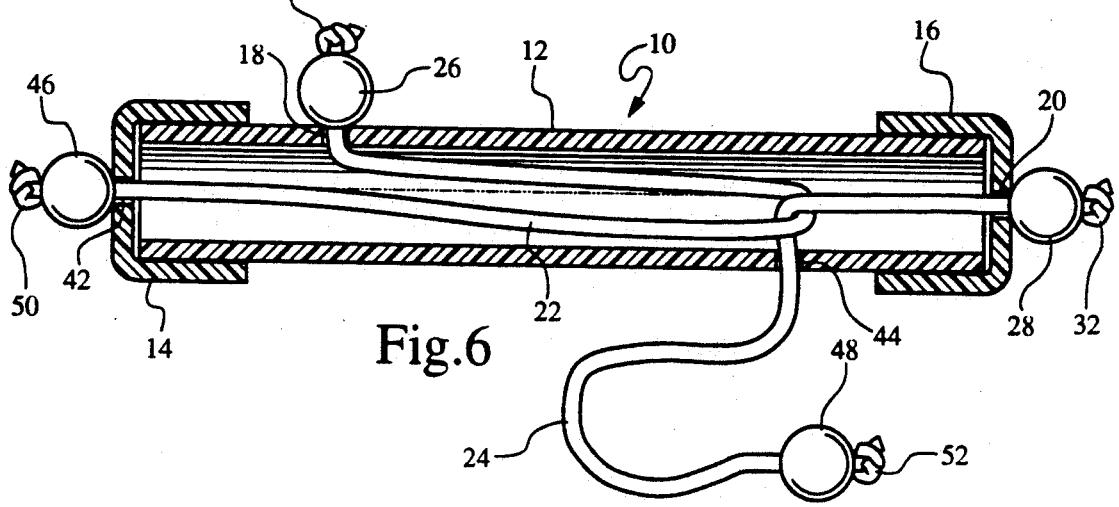

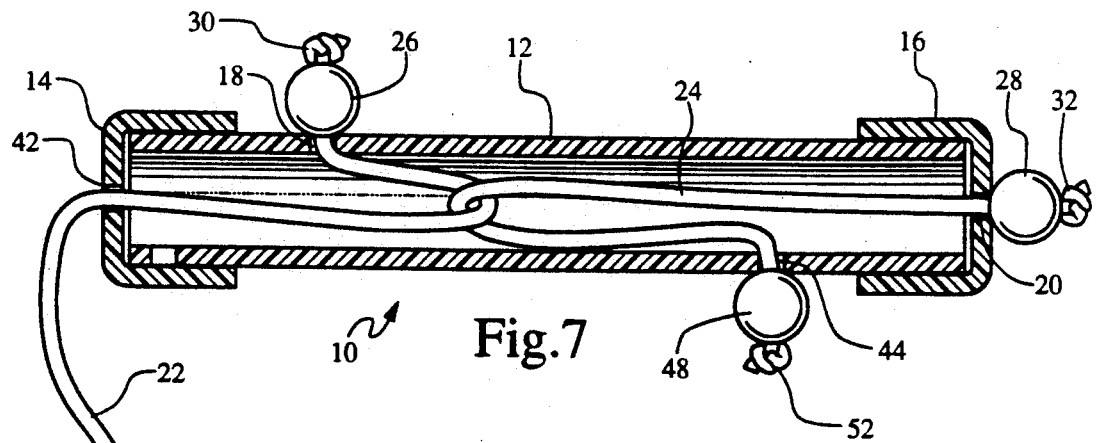
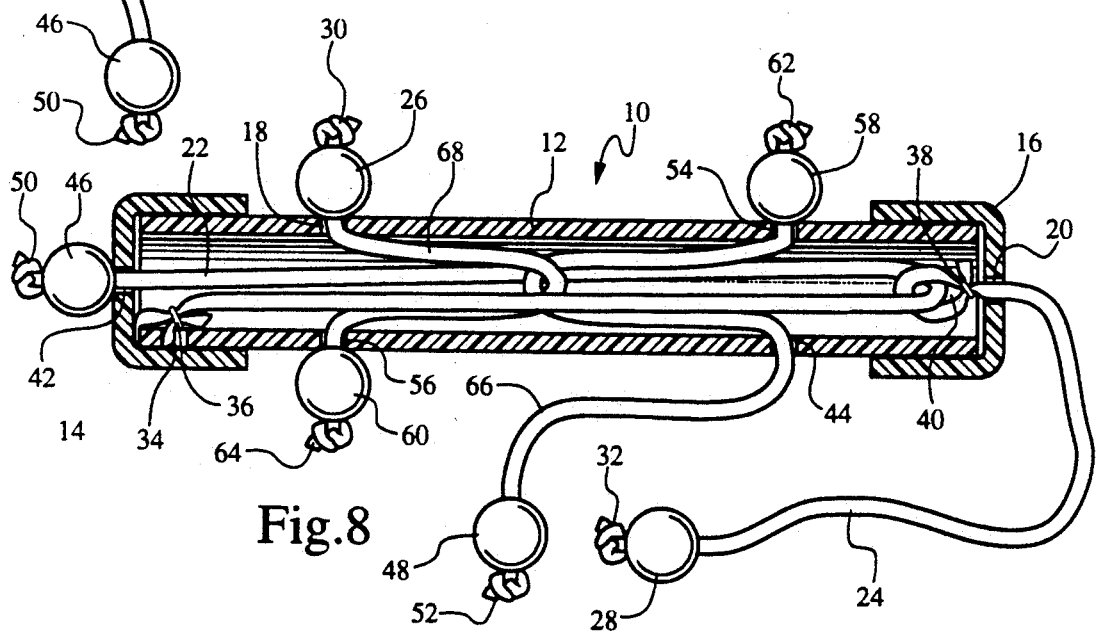
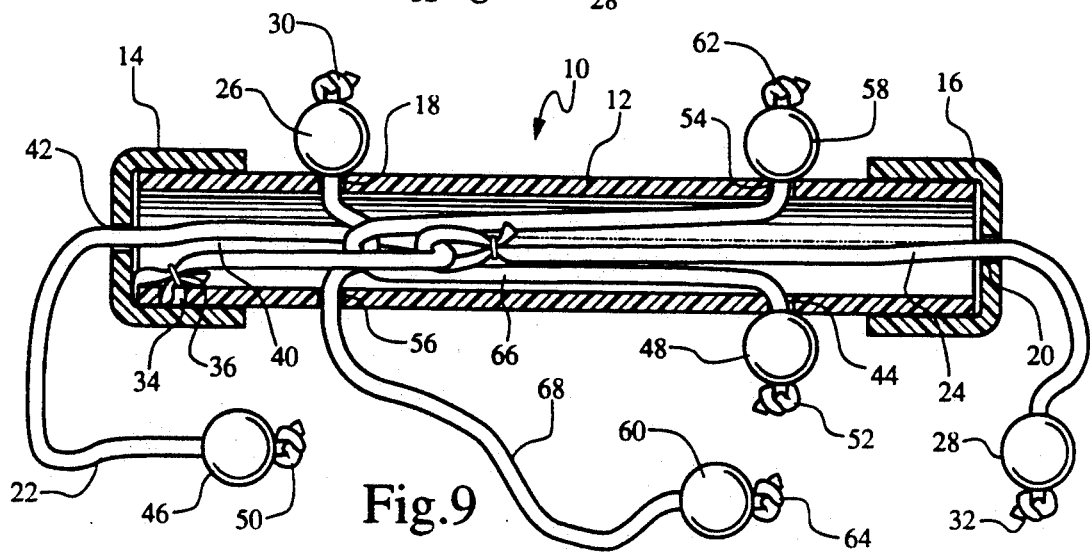

EDUCATIONAL DEVICE

TECHNICAL FIELD OF THE INVENTION

The invention relates to an educational device to develop process-oriented thought skills. More particularly the invention relates to a device that challenges the mind by requiring a determination of a configuration of ropes in a concealed chamber.

BACKGROUND OF THE INVENTION

The need to improve education, especially in science and mathematics, has fostered a search for better and more effective teaching methods. One development has been the move from fact-learning teaching methods which concentrate on memorization and recitation to process-oriented teaching methods which focus on developing problem-solving skills. This movement was justified, in part, by the recognition that teaching a student to solve a problem early in their academic lives produces a better understanding of scientific and mathematical principles in future educational endeavors. Also, a student who possesses process-oriented skills is believed to be capable of easily finding facts in reference materials while a student who only learns facts may be unable to perceive, understand, and conceptualize the underlying principles. Thus, the move toward process-orientated learning has created a need for demonstrative tools and other aids that can be used by the teacher in the classroom.

The present invention discloses a process and apparatus which permits and encourages the use of process-oriented thinking and which enables teachers to effectively and efficiently assist students in the art of creative thinking. In addition, the present invention discloses a device that incorporates simple structural elements combined in unique manners to create an educational tool to enable students to learn a process of thinking that in effect lasts a life-time.

SUMMARY OF THE INVENTION

The present invention discloses an educational device for permitting a person to mentally determine the internal configuration of the device. The device generally comprises a substantially cylindrical opaque tube having a first end and a second end. The tube has two caps connected at each of its ends to create a chamber. A plurality of holes extend through pre-determined positions along the chamber. The invention also discloses the use of a plurality of ropes having a first end and a second end. One end of each rope extends through a selected hole of the chamber. The ropes are interconnected to be slideably engageable with one another within the chamber. Beads can be connected to the exposed ends of the ropes such that when a bead at one end is pulled, the other rope correspondingly moves until the bead of the other rope stops movement. The invention discloses a method for teaching students a problem-solving method by challenging the student to mentally determine the internal configuration of a device where pulling one rope end causes a movement of another rope end.

In manufacturing the subject invention, a tube made of polyvinylchloride (PVC) is cut to a calculated, pre-determined length. In one embodiment, nylon cord is cut to selected lengths to create two ropes. A fastener secures one end of a first rope to the inner wall of the tube and the second end of the first rope is threaded through a loop created at the first end of the second rope. The first rope is then threaded through a hole created in a first cap which is subsequently positioned at the first end of the tube. The second end of the second rope is threaded through a hole of a second cap and the second cap is subsequently positioned at the second end of the tube. Beads are connected to the exposed portions of the first and second ropes to create one embodiment of the invention.

DESCRIPTION OF THE DRAWINGS

FIG. 4 is a cross-sectional view of the second embodiment of the present invention in a first position;

FIG. 5 is a cross-sectional view of the second embodiment of the present invention in a second position;

FIG. 6 is a cross-sectional view of the third embodiment of the present invention in a first position;

FIG. 7 is a cross-sectional view of the third embodiment of the present invention in a second position;

FIG. 8 is a cross-sectional view of the fourth embodiment of the present invention in a first position; and FIG. 9 is a cross-sectional view of the fourth embodiment of the present invention in a second position.

DETAILED DESCRIPTION OF THE INVENTION

Figure 1:
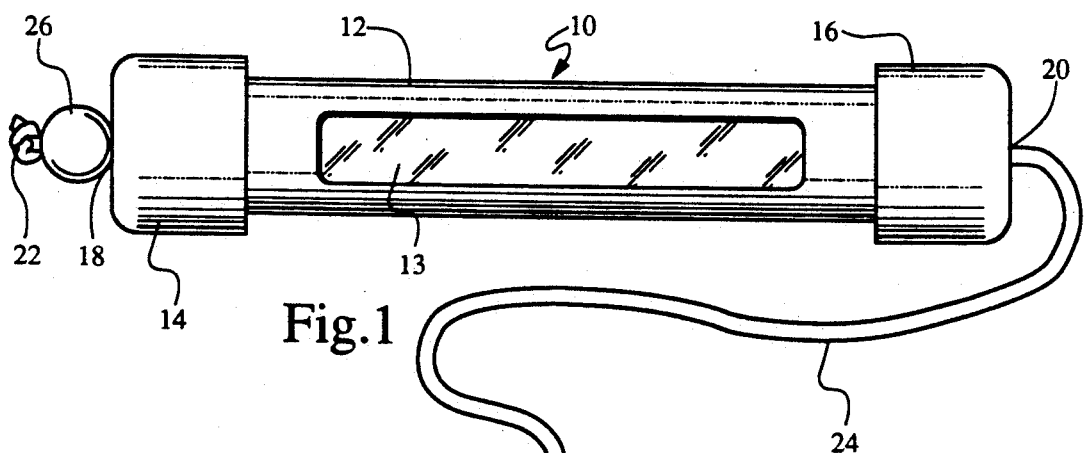
FIG. 1 is a perspective view of the first embodiment of the present invention.

The present invention is an educational device for permitting the user to mentally determine the internal configuration of the device which is generally designated 10 in FIG. 1. As can be seen device 10 generally comprises a tube 12 having caps 14 and 16 connected at each of its ends. Caps 14 and 16 have holes running therethrough which are indicated as holes 18 and 20, respectively. Ropes 22 and 24 are insertably connected through holes 18 and 20 into tube 12. The configuration of ropes 22 and 24 within tube 12 will be more readily understood by reference to the subsequent specification. In addition, beads 26 and 28 are slideably connected to ropes 22 and 24. It should be understood that beads 26 and 28 can be knots, knobs, twists, fixed or unfixed, or any other suitable or similar formation. Tube 12 may be equipped with a hatch 13 permitting a view of the inside of tube 12. The operation and use of device 10 will be more readily understood by referring to subsequent figures and their detailed description.

Figure 2:
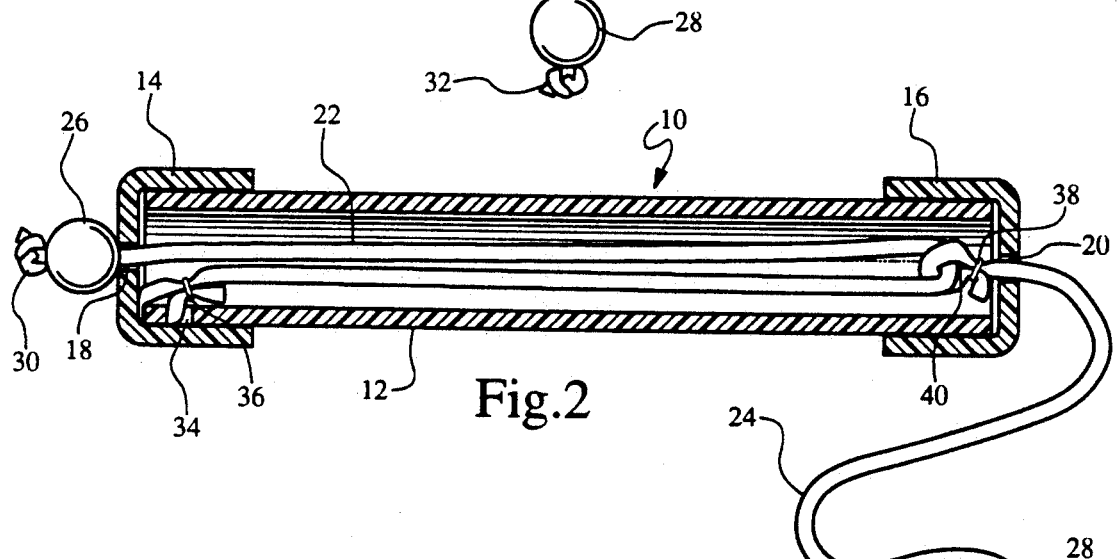
FIG. 2 is a cross-sectional view of the first embodiment of the present invention in a first position.

In reference to FIG. 2 one embodiment of the present invention is shown. Device 10 is generally a substantially cylindrical opaque tube which is generally cut to a predetermined length. As can be appreciated by one skilled in the art tube 12 can be made of polyvinylchloride (PVC), polyethylene (PE), or transparent material, or any other suitable material. Tube 12 in one embodiment is approximately eighteen inches in length. In addition, it should be understood that tube 12 may be equipped with the hatch (not shown) permitting a view of the inside of tube 12 without departing from the true meaning and spirit of the present invention. The diameter of tube 12 can vary but in one embodiment is generally one-half of an inch.

A first cap 14 is slideably connected to the first end of tube 12. A second cap 16 is slideably connected to the second end of tube 12. It can be appreciated that caps 14 and 16 can be connected to tube 12 in one of several manners such as by securing with glue, threadably engageable, slideably engageable, or formed as integrated extensions of tube 12. Caps 14 and 16 are preferably made of the same material as tube 12, but may be made of polyethylene or any other suitable material. First cap 14 has a hole 18 contained therein. Hole 18 can be made by several methods such as drilling or molding into specific configurations. Likewise, hole 20 is contained in cap 16.

Tube 12 has an opening 34 at its first end for having a first rope 22 ran therethrough and securely fastened with fastener 36. In the preferred embodiment rope 22 is thirty-three and a half inches in length, but it should be readily understood that any suitable length that enables operation of the device as disclosed herein suffices. The other end of rope 22 is threaded through a loop 40 which is created by having a second rope 24 looped and fastened with a fastener 38. Second rope 24 in the preferred embodiment is nineteen and a quarter inches in length. The rope 22 runs through hole 18 of cap 14 and extends outside the internal portion of tube 12. Rope 24 is extended through hole 20 to expose a selected portion of the rope. A bead 28 is connected to rope 24 and a knot 32 is created on rope 24 that secures bead 28 to rope 24. A bead 26 is connected to rope 22 and a knot 30 is created on rope 22 to secure bead 26 in position.

Figure 3:
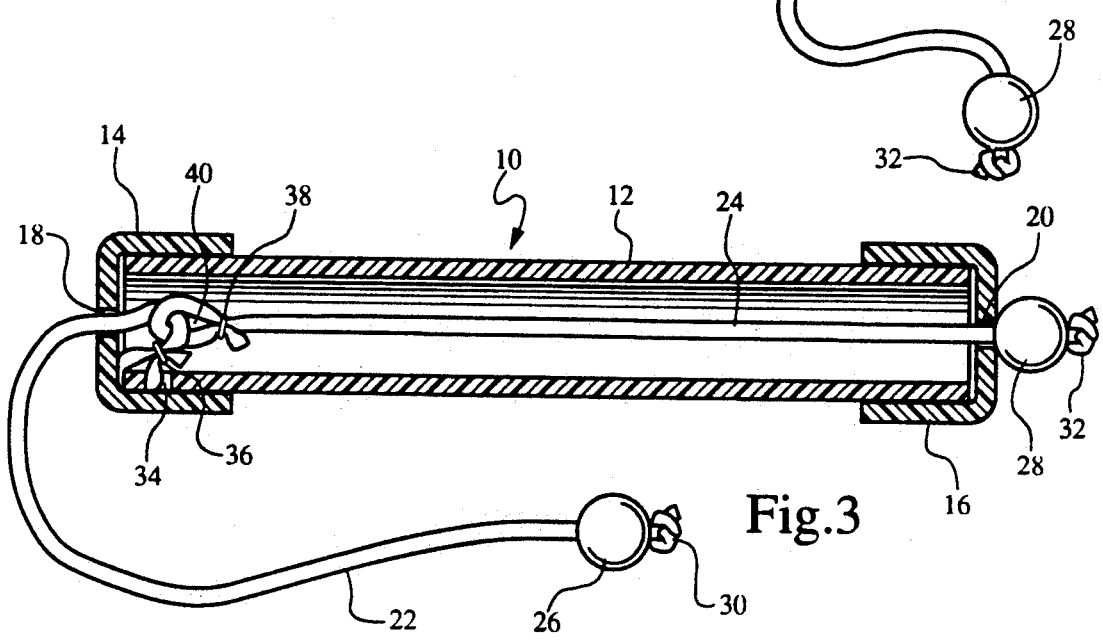
FIG. 3 is a cross-sectional view of the first embodiment of the present invention in a second position.

The first embodiment can be more readily understood by reference to FIG. 3 wherein bead 26 is manually moved in a coaxial outwardly direction away from the second end of tube 12. The movement of bead 26 causes rope 22 to slide along loop 40. The movement of loop 40 in the coaxial direction away from the second end of tube 12 causes bead 28 to correspondingly move in a similar direction. The movement of rope 24 is stopped by bead 28 when bead 28 abuts cap 16 along hole 20. The invention discloses educational device 10 which permits the user to eventually determine the internal configuration of the device when movement is given to device 10. In a similar manner, bead 28 can be moved in a coaxial manner away from the first end of tube 12 towards the second end of tube 12 to cause rope 22 to correspondingly move and stop when bead 26 contacts cap 14. Such movement would cause device 10 to be in the same position as illustrated in FIG. 2.

The second embodiment of the present invention can be more readily understood by reference to FIG. 4 which shows a device 10 comprising a tube 12 having two ends and being approximately eighteen inches long in its preferred embodiment. Cap 14 is slideably connected to one end of tube 12 and cap 16 is slideably connected to second end of tube 12. Device 10 has holes 18, 20, 42 and 44 through which are inserted the two ends of ropes 22 and 24. A first end of rope 22, which in its preferred embodiment is approximately twenty and a half inches in length, is inserted through hole 18 and connected to bead 26, which is secured to rope 22 with knot 30. Rope 22 runs through tube 12 and exits through hole 42 where it is connected to bead 46, which is secured to rope 24 with knot 50. A second rope 24, which is approximately twenty and a half inches in length in its preferred embodiment, having one end running through hole 20 away from tube 12 and connected to bead 28, bead 28 being secured to rope 24 by knot 32. Rope 24 is inserted through tube 12 at hole 20 and is interconnected with rope 22 in such a way so that rope 24 is slideably engageable with rope 22. Rope 24 exits tube 12 through hole 44 and is connected to bead 48, wherein bead 48 is secured to rope 24 by knot 52.

The second embodiment can be more easily understood by reference to FIG. 5 wherein movement of bead 46 may be pulled away from tube 12 through hole 42 in such a way as to cause movement of rope 24 within tube 12. Movement of bead 46 through hole 42 and way from tube 12, will cause movement of bead 48 and rope 24 in a general coaxial direction to tube 12. Bead 48 will cease movement of rope 24 when it contacts against tube 12 near hole 44. As shown in FIG. 5 a substantial portion of rope 22 will be exposed outside tube 12 and the configuration shown after bead 46 is pulled and bead 52 stops movement of rope 24. It should be readily understood that FIG.'s 4 and 5 taken together disclose an invention whereby bead 26 may be pulled to cause a correspondingly similar movement of bead 48 and rope 24 into tube 12 along a general coaxial direction. Further, it should be readily understood that FIGS. 4 and 5 taken together disclose an invention whereby bead 28 may be pulled outwardly from tube 12 to cause a correspondingly similar motion of either bead 26 and bead 46 and rope 22 in a general coaxial direction to tube 12.

The third embodiment of the present invention can be more readily understood by reference to FIG. 6. FIG. 6 shows a device 10 having a tube 12, preferably eighteen inches in length, and two caps 14 and 16 placed generally around the ends of tube 12. Cap 14 is slideably connected to one end of tube 12 and cap 16 is slideably connected to the second end of tube 12. The device 10 has holes 18, 20, 42 and 44 through which are inserted the two ends of ropes 22 and 24, which in its preferred embodiment are approximately twenty-two inches in length. Cap 14 has a hole 42 extending from it through which rope 22 is inserted into tube 12. Rope 22 has one end connected to a bead 46 which is secured to rope 22 via a knot 50. Rope 22 passes through tube 12 and exits out through hole 18 where it is connected to a bead 26 which is secured to rope 22 with knot 30. Device 10 has a second rope 24 where one end of rope 24 is inserted through hole 20 outwardly from tube 12 and connected to bead 28 which is secured to rope 24 with knot 32. Rope 24 enters tube 12 through hole 20 and is interconnected with rope 22 so it is slideably engageable with rope 22. Rope 24 exits tube 12 through hole 44 and is connected to bead 48 which is secured to rope 24 with knot 52. FIG. 6 shows the third embodiment of the present invention in a position where a substantial length of rope 24 extends outwardly from tube 12.

To better understand the third embodiment of the present invention, reference is made to FIG. 7. FIG. 7 shows device 10 having tube 12 and two caps 14 and 16 generally placed around the ends of tube 12. Bead 46 is pulled outward from tube 12 in a general coaxial manner through hole 42 of cap 14. The pulling of bead 46 out from tube 12 along a general coaxial direction causes a corresponding movement of rope 24 so that the exposed length as shown in FIG. 6 of rope 24 decreases and a substantial portion of rope 24 is drawn into tube 12. Rope 24 will continue movement bead 48 makes contact with tube 12 generally around hole 44. It should also be understood that the present invention discloses a device 10 whereby bead 26 may be pulled outwardly from tube 12 causing a corresponding movement of rope 24 and bead 48 along a general coaxial direction. It should further be understood that the present invention discloses device 10 whereby bead 28 may be pulled outward from tube 12 in a general coaxial manner so as to cause a corresponding movement of either bead 26 or bead 46 and rope 22 in a general coaxial direction to tube 12.

The fourth embodiment of the present invention can be more readily understood by reference to FIG. 8. FIG. 8 shows device 10 having tube 12, approximately eighteen inches in length in its preferred embodiment, whereby at one end of tube 12 is slideably attached a cap 14 having a hole 42 through which one end of rope 22, approximately thirty-three and a half inches in length in its preferred embodiment, passes. Cap 16 is slideably attached to the other end of tube 12. Rope 22 is connected to bead 46 which is secured to secured to rope 22 with knot 50. Rope 22 passes through tube 12 through hole 42 and through a loop 40 of second rope 24. The other end of rope 22 is secured to the inside of tube 12 with fastener 36 and hole 34. Rope 24, which is approximately nineteen and a quarter inches in length in its preferred embodiment, passes through hole 20 of cap 16 and is connected to bead 28 which is secured to rope 24 with knot 32. Rope 24 enters tube 12 through hole 20 of cap 16 and forms a loop 40 which is kept in form with fastener 38. Device 10 of FIG. 8 shows a third rope 68, preferably twenty and a half inches in length, which enters tube 12 through hole 18 and runs through tube 12 exiting at hole 56. Rope 24 is connected to bead 60 which is secured to rope 68 with knot 64. Rope 24 runs through hole 18 outward from tube 12 and is connected to bead 26 which is secured to rope 24 via knot 30. A fourth rope 66, approximately twenty and a half inches long in its preferred embodiment, which runs through hole 54 of tube 12 and connects to bead 58 which is secured to rope 66 with knot 62. Rope 66 runs through tube 12 and is interconnected with rope 24 so that it is slideably engageable with rope 24. Rope 66 exits tube 12 through hole 44 which is generally located noncoplanar position to hole 18. Rope 66 is connected to bead 48 with knot 52. As shown in FIG. 8 a substantial portion of rope 66 remains outside tube 12 in one position.

To better understand the fourth embodiment of the present invention, reference is made to FIG. 9. FIG. 9 shows device 10 comprising a tube 12 having two ends about which caps 14 and 16 are placed. In FIG. 9 bead 46 is pulled out through hole 42 of cap 14 causing a corresponding movement of rope 22 outwardly from tube 12. The movement of rope 22 which passes through loop 40 of rope 24 causes a corresponding movement of rope 24 in a generally coaxial direction to tube 12. Movement of rope 24 within tube 12 ceases when bead 28 makes contact with cap 16 generally around hole 20. As bead 46 is fully pulled outwardly from tube 12, a substantial length of rope 22 will lay outside of tube 12. FIG. 9 shows a second rope 68 connected to bead 60 which is secured to rope 68 with knot 64. Pulling bead 60 outwardly from tube 12 causes a corresponding movement of rope 68 through hole 56. A substantial portion of rope 24 will lay outside tube 12 when bead 48 makes contact with tube 12 at hole 44. It should be readily apparent to one skilled in the art that FIG. 9 discloses an embodiment of the present invention whereby the movement of bead 58 being secured to rope 66 will cause a corresponding movement of rope 68 and bead 60 towards tube 12 at hole 56. A movement of bead 26 being secured to rope 68 by knot 30 will cause a corresponding movement of rope 66 within tube 12 as well as a movement of bead 58 generally towards tube 12 at hole 54 and a movement of bead 48 towards tube 12 at hole 44.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. An educational device for a user comprising:
   a chamber having a first end and a second end, said chamber having a plurality of holes extending therethrough;
   a plurality of ropes extending through said holes and slideably engageable with each other; and
   a plurality of knobs connected to said ropes for permitting user to pull said knob to move one said rope such that another said rope correspondingly moves.

2. The device as recited in claim 1, wherein said chamber is a substantially cylindrical tube having a first cap and a second cap connected to each end of said tube.

3. The device as recited in claim 1, further comprising a hatch connected to said chamber to permit viewing of the interior of said chamber.

4. The device as recited in claim 1, wherein said chamber is substantially opaque.

5. The device as recited in claim 1, wherein said plurality of ropes comprises:
   a first rope having a first end and second end, said first end of first rope positioned inside said chamber and having a loop formed therefrom, said second end of said first rope extending outwardly through one said hole of said chamber and having a first knob connected therefrom, said first knob positioned outside said chamber; and
   a second rope having a first end and second end, said first end of said second rope fastenly secured to inside of said chamber, said second end of said second rope extending through said loop formation and extending outwardly through another said hole of said chamber and having a second knob connected therefrom, said first knob positioned outside said chamber.

6. A puzzle for permitting a user to mentally determine the internal configuration of the puzzle comprising:
   a substantially cylindrical opaque tube having first end and a second end;
   two caps connected to said ends of said tube to create a chamber;
   a plurality of holes extending through said chamber;
   two ropes each having a first end and a second end, said first end of each rope extending through said chamber and interconnected with the first end of the other rope; and
   a knob connected to said second end of each rope to stop the movement of one said rope when the other said rope is pulled and correspondingly moves said rope to permit the user to mentally determine the internal configuration of said puzzle.

7. The puzzle as recited in claim 6 having a first hole and second hole, said first hole extending through said first cap, and said second hole extending through said second cap.

8. The puzzle as recited in claim 7, wherein said two ropes comprise:

a first rope having a first end and second end, said first end of first rope positioned inside said chamber and having a loop formed therefrom, said second end of said first rope extending outwardly through one said hole of said chamber and having a first knob connected therefrom, said first knob positioned outside said chamber; and a second rope having a first end and second end, said first end of said second rope fastenly secured to inside of said chamber, said second end of said second rope extending through said loop formation and extending outwardly through another said hole of said chamber and having a second knob connected therefrom, said first knob positioned outside said chamber.

9. The puzzle as recited in claim 8 wherein said two ropes comprise:
   a first rope; and
   a second rope, length of said second rope proportioned to length of said first rope such that when the user pulls on said knob connected to said first rope substantially the entire length of said second rope is drawn into said tube and substantially the entire length of said first rope remains outside said tube.

10. The puzzle as recited in claim 6 wherein said knobs are beads.

11. The puzzle as recited in claim 6 wherein said knobs are knots.

12. The puzzle as recited in claim 6 wherein said plurality of holes and said two ropes comprise:
   a first hole and second hole, said first hole extending through said first cap, and said second hole extending through said second cap;
   a third hole extending through from said tube;
   a fourth hole extending through said tube in a generally noncoplanar direction from said third hole;
   a first rope having a first end and second end, said first end of said first rope extending outward from said tube through said first hole and having a first knob connected therefrom, and said second end of said first rope extending outwardly through said third hole of said tube and having a second knob connected therefrom; and
   a second rope, said second rope interconnected with said first rope, said second rope having a first and second end, said first end of said second rope extending outward from said tube through said second hole and having a third knob connected therefrom, and said second end of said second rope extending outwardly from said tube through said fourth hole and having a fourth knob connected therefrom.

13. The puzzle as recited in claim 12 having a first rope and a second rope, length of said second rope proportioned to length of said first rope such that when the user pulls on said first end of said first rope with said first knob substantially the entire length of said second rope is drawn into said tube and substantially the entire length of said first rope remains outside said tube.

14. The puzzle as recited in claim 6 further comprising a hatch connected to said chamber to permit viewing of the interior of said chamber.

15. The puzzle as recited in claim 6 comprising:
   a first hole extending through from said tube;
   a second hole, said second hole extending through said tube in a generally noncoplanar direction from said first hole;
   a third hole extending through said tube;
   a fourth hole, said fourth hole extending through said tube in a generally noncoplanar direction from said third hole;
   a first rope having a first end and second end, said first end of said first rope extending outward from said tube through said first hole and having a first knob connected therefrom, and said second end of said first rope extending outwardly through said third hole of said tube and having a second knob connected therefrom; and
   a second rope, said second rope interconnected with said first rope, said second rope having a first and second end, said first end of said second rope extending outward from said tube through said second hole and having a third knob connected therefrom, and said second end of said second rope extending outwardly from said tube through said fourth hole and having a fourth knob connected therefrom.

16. The puzzle as recited in claim 15 having a first rope and a second rope, length of said second rope proportioned to length of said first rope such that when the user pulls on said first end of said first rope with said first knob substantially the entire length of said second rope is drawn into said tube and substantially the entire length of said first rope remains outside said tube.

17. A method for manufacturing an educational device comprising the steps of:
   creating a chamber from a suitable material;
   placing holes throughout said chamber at predetermined locations;
   cutting a plurality of ropes to predetermined lengths, said ropes having a first end and a second end;
   interconnecting said first end of said ropes with so that ropes are slideably engageable with each other inside said chamber; and
   exposing said second end of each rope from said chamber.

18. The method as recited in claim 17 further comprising the steps of:
   attaching a bead to said first end of said ropes; and
   attaching a bead to said second end of said ropes.

19. The method as recited in claim 17 further comprising the steps of:
   creating a loop with a first end of a rope; and
   fastening said loop so that said loop retains its form.

20. The method as recited in claim 17 further comprising the step of securely fastening a first end of a rope inside said chamber.

* * * * *